US007751930B2

(12) United States Patent
Valerino, Sr.

(10) Patent No.: US 7,751,930 B2
(45) Date of Patent: Jul. 6, 2010

(54) AUTOMATIC EMPTY CARRIER STORAGE, RETRIEVAL AND DISTRIBUTION SYSTEM

(75) Inventor: Fred M. Valerino, Sr., Timonium, MD (US)

(73) Assignee: Pevco Systems International, Inc., Baltimore, MD (US)

( * ) Notice: Subject to any disclaimer, the term of this patent is extended or adjusted under 35 U.S.C. 154(b) by 120 days.

(21) Appl. No.: 11/068,084

(22) Filed: Feb. 24, 2005

(65) Prior Publication Data

US 2005/0273196 A1  Dec. 8, 2005

Related U.S. Application Data

(63) Continuation of application No. 08/935,091, filed on Sep. 25, 1997, now abandoned, which is a continuation-in-part of application No. 08/513,569, filed on Aug. 10, 1995, now Pat. No. 5,805,454.

(51) Int. Cl.
*G07F 7/00* (2006.01)
(52) U.S. Cl. .................. 700/230; 700/216; 700/218; 700/215; 406/2; 406/4
(58) Field of Classification Search ................ 700/215, 700/216, 218, 230; 406/2, 4
See application file for complete search history.

(56) References Cited

U.S. PATENT DOCUMENTS

| 4,128,863 | A | * | 12/1978 | Premetz ..................... 362/249 |
| 4,218,863 | A | * | 8/1980 | Howard et al. ................ 53/547 |
| 4,239,420 | A | * | 12/1980 | Thibonnier et al. ............ 406/2 |
| 4,817,694 | A | * | 4/1989 | Matsuo et al. ........... 198/346.2 |
| 4,820,086 | A | * | 4/1989 | Kieronski ................... 406/112 |
| 4,958,716 | A | * | 9/1990 | Matsuo et al. ........... 198/346.1 |
| 5,156,093 | A | * | 10/1992 | Azukizawa et al. ......... 104/284 |
| 5,217,328 | A | * | 6/1993 | Lang ............................. 406/1 |
| 5,234,292 | A | * | 8/1993 | Lang ............................. 406/1 |
| 5,502,944 | A | * | 4/1996 | Kraft et al. ..................... 53/55 |
| 5,584,613 | A | * | 12/1996 | Greene et al. ................ 406/19 |
| 5,586,686 | A | * | 12/1996 | Bustos et al. ............... 221/211 |
| 5,657,851 | A | * | 8/1997 | Speckhart et al. ........ 198/465.4 |
| 5,805,454 | A | * | 9/1998 | Valerino et al. ............. 700/215 |
| 5,864,485 | A | * | 1/1999 | Hawthorne et al. ......... 700/229 |
| 5,896,297 | A | * | 4/1999 | Valerino, Sr. ............... 700/213 |
| 5,985,214 | A | * | 11/1999 | Stylli et al. ................... 422/65 |

FOREIGN PATENT DOCUMENTS

| DE | 4004018 | A | * | 8/1991 |
| FR | 2638724 | A | * | 5/1990 |

* cited by examiner

*Primary Examiner*—Patrick Mackey
*Assistant Examiner*—Michael E. Butler
(74) *Attorney, Agent, or Firm*—Ward & Olivo

(57) ABSTRACT

The present invention relates to pneumatic tube systems generally. More specifically, it relates to an automated system for the storage and distribution of empty carriers for a pneumatic tube system. The system comprises an easy to use one-touch process and includes the following apparatus: storage cabinets and pneumatic tube system comprising a blower, controller, retrieval cabinets, and main station.

According to the invention there is provided an automated storage and distribution system comprising a pneumatic tube system, a first diverter with blower, and a storage cabinet with a second diverter. The system comprises several methods which are currently in the market place, and is useful in many places, such as hospitals, where the automated processing of pharmaceutical products via robot devices is used. Such a system is disclosed in co-pending application Parenteral Products Automation System (PPAS), application Ser. No. 08/513,569.

16 Claims, 9 Drawing Sheets

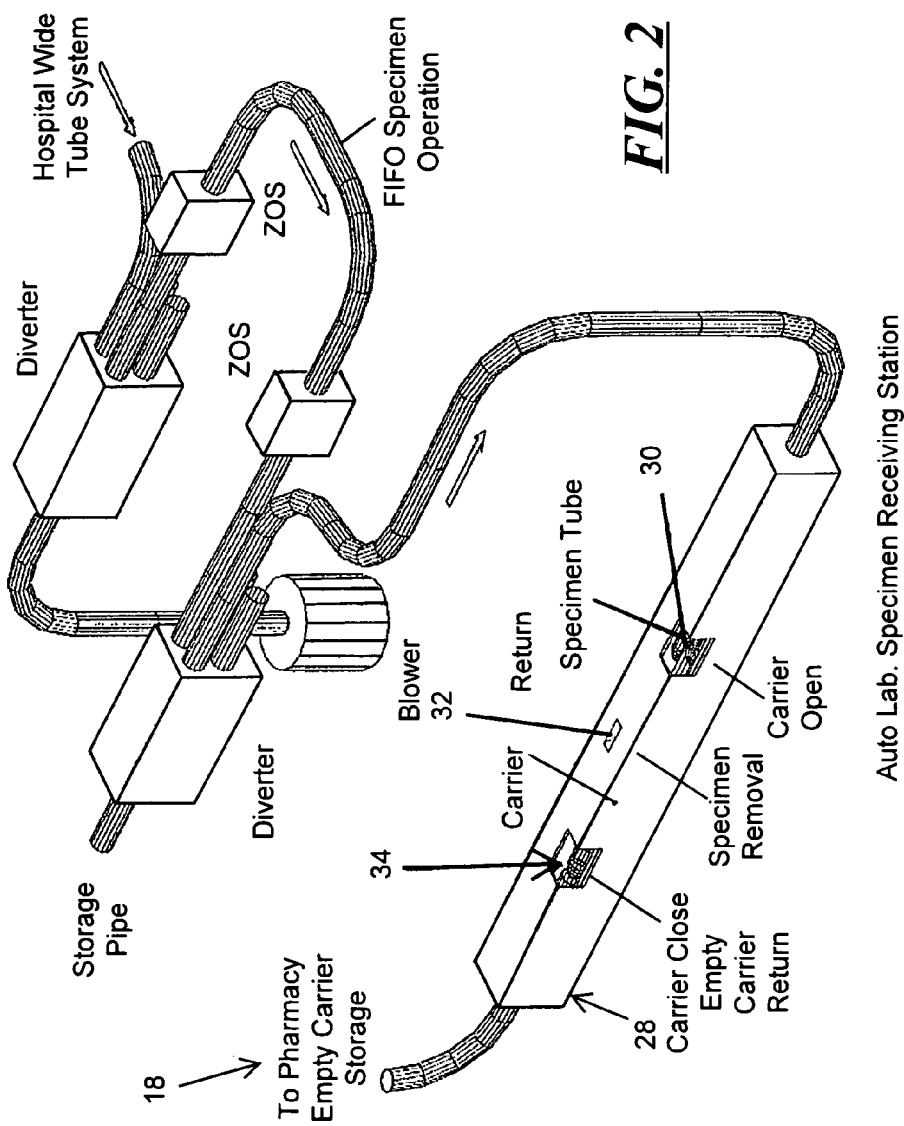

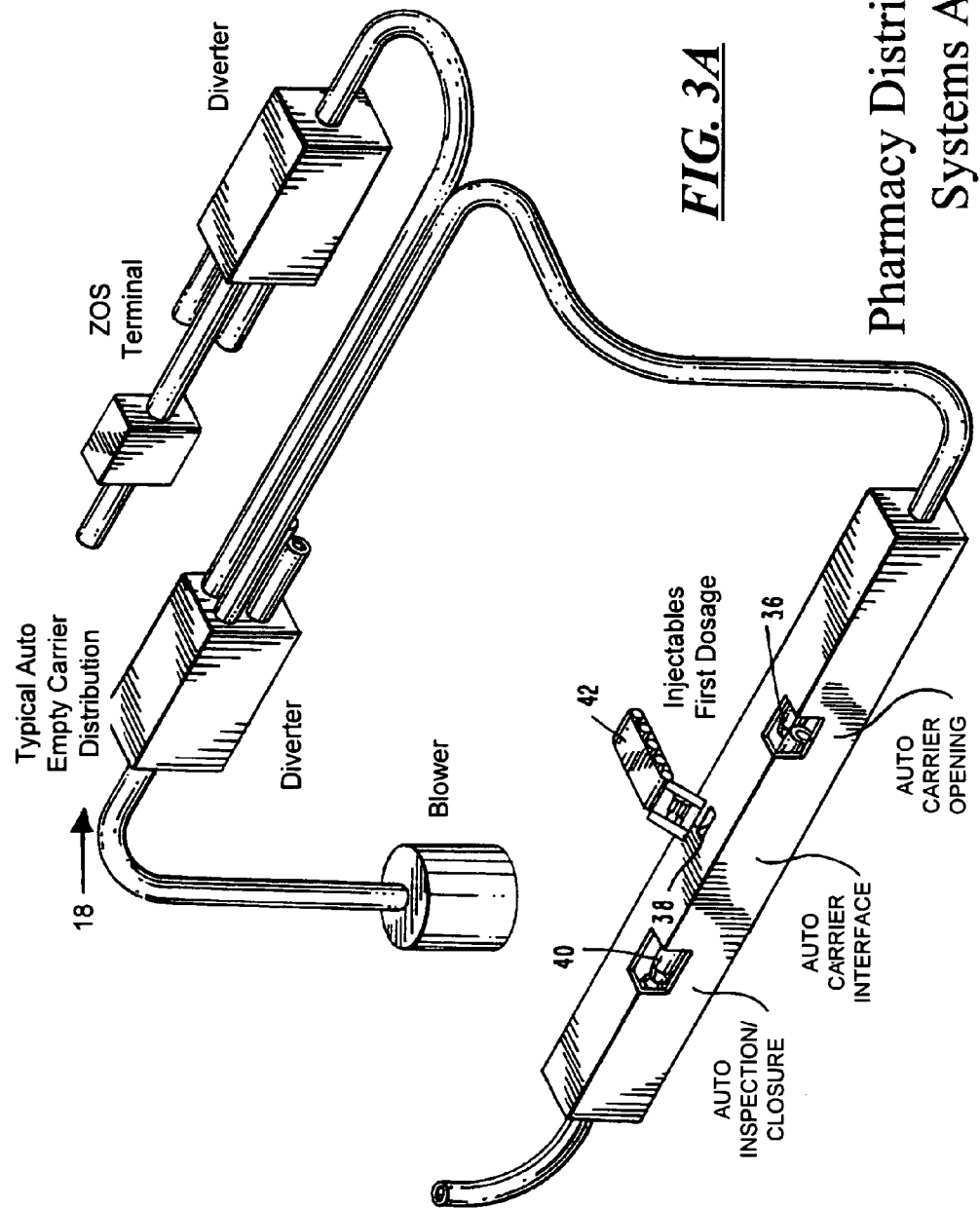

Pharmacy Distribution Systems B

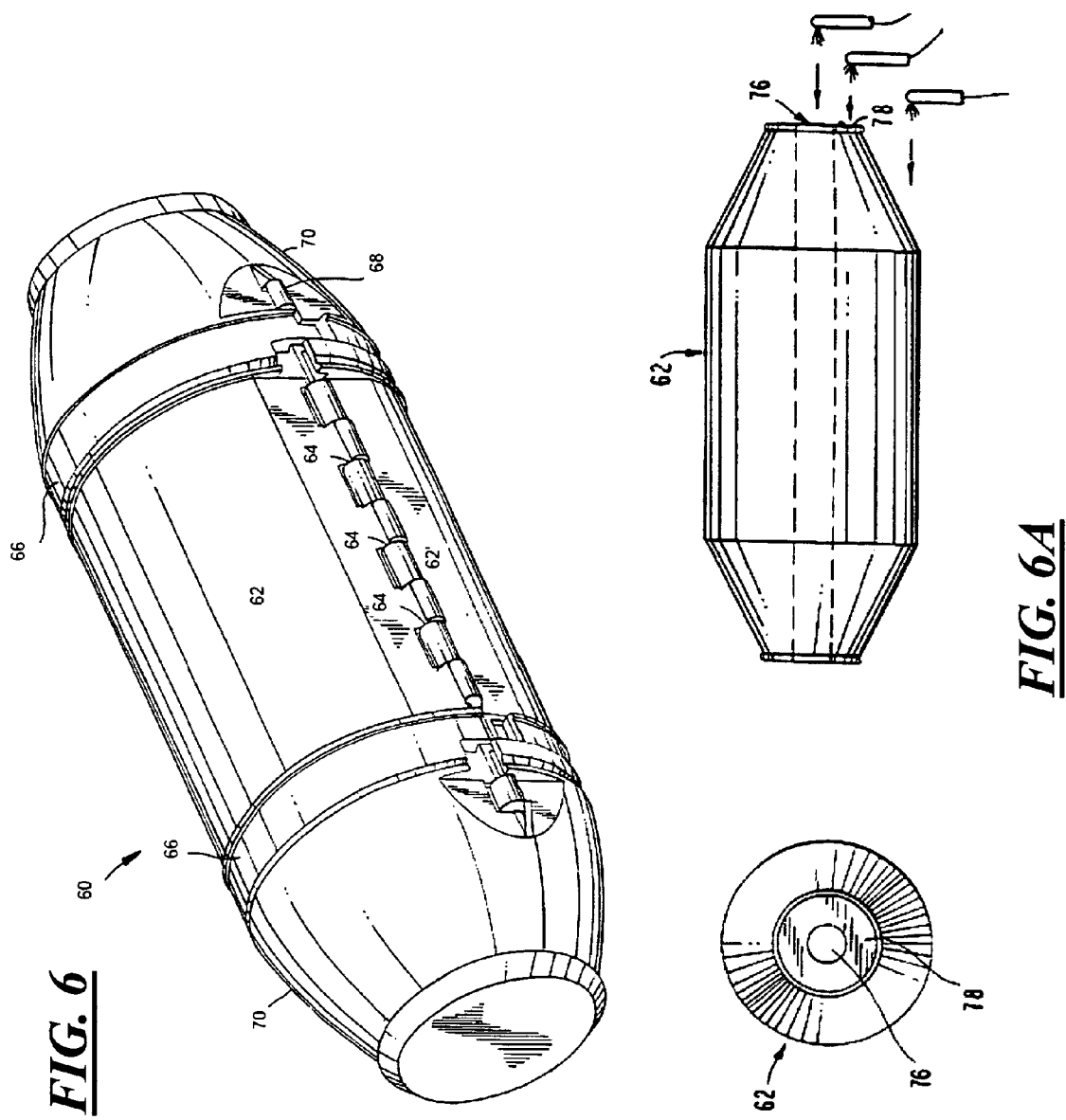

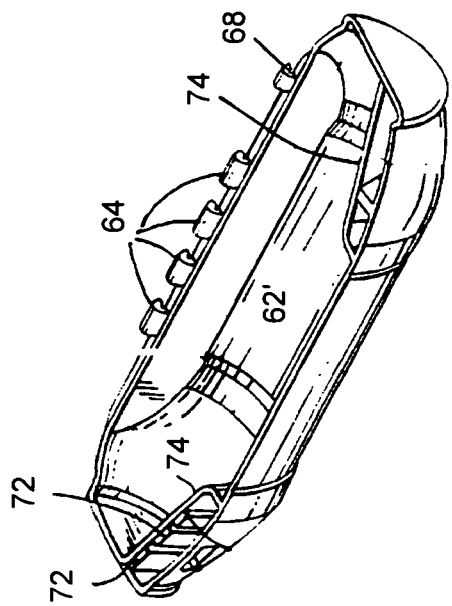
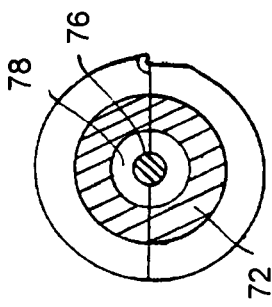
FIG. 7C
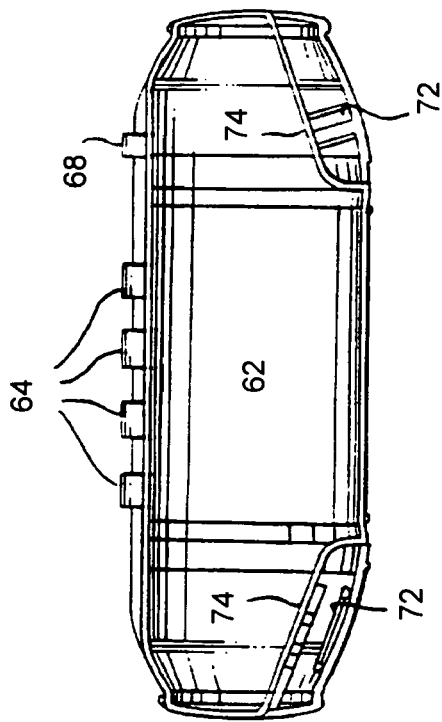
FIG. 7A
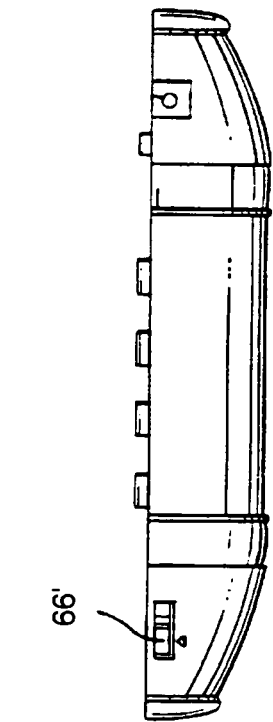
FIG. 7B

AUTOMATIC EMPTY CARRIER STORAGE, RETRIEVAL AND DISTRIBUTION SYSTEM

CROSS-REFERENCE TO RELATED APPLICATIONS

This application is a continuation of application Ser. No. 08/935,091, filed Sep. 25, 1997, now abandoned which is a continuation-in-part of application Ser. No. 08/513,569, filed Aug. 10, 1995 now U.S. Pat. No. 5,805,454.

TECHNICAL FIELD

The present invention relates to pneumatic tube systems generally. More specifically, it relates to an automated system for the remote storage and automatic distribution of empty carriers for a pneumatic tube system. The system comprises an easy to use one-touch process which includes the following apparatus: storage pipes and pneumatic tube system comprising a blower, a controller, diverters, and a main zone diverter. Further, the system comprises the ability to use a process whereby empty carriers can be stored for later automatic retrieval and distribution from individual storage units housed in retrieval cabinets which have separate pneumatic tube blowers, integrated controllers, and a robotics interface, all contained within a pneumatic tube system.

Pneumatic tube transportation systems are currently used to transfer Pharmaceuticals, blood samples, medicines, intravenous bags, viral samples or other biological or chemical matter between locations within a hospital, laboratory, etc., quickly and reliably. Manual delivery can be slow and unreliable, causing a number of problems, such as harm to patients in hospitals. Thus, it is an object of this invention to combine the pneumatic tube system with an automated storage and distribution apparatus to provide a complete automated system for the efficient operation of a pneumatic tube system. Another object of this invention is to provide an automatic storage, retrieval and distribution system for empty pneumatic tube carriers from a central storage area to either a robotics interface or a predetermined station within the pneumatic tube system, all without any manual intervention.

BACKGROUND OF THE INVENTION

According to the invention there is provided an automated storage and distribution system comprising a pneumatic tube system, a connecting diverter with blower, and storage piping with diverters. The system comprises several methods which are currently in the market place, and is useful in many places, such as hospitals, where the automated processing of pharmaceutical products via robot devices is used. Such a system is disclosed in co-pending application Parenteral Products Automation System (PPAS), application Ser. No. 08/513,569. There, a system is disclosed wherein robot devices are employed having gripping means presentable to a plurality of stations, each station being adapted to cooperate with the robot device in a sequence of operations such as to produce a measured pharmaceutical dose from a supply of a pharmaceutically acceptable substances, and one of the stations comprising means for locating in parallel a plurality of medical hypodermic syringes for containing a said substance and for operating said syringe. The substance might comprise a medication to be administered to a patient, or a potentially biologically damaging substance, such as a radionuclide or a cytotoxin. The measured dose might be retained in a said syringe, or in a medical vial. Preferably, means are provided for controlling the apparatus in a predetermined sequence of operations.

Sterility is an essential characteristic of injectable and ophthalmic pharmaceutical products. This characteristic is imparted to the product by virtue of the type of manufacturing process. If during the process, all components, solutions and equipment are pre-sterilized and assembled aseptically, that is, using techniques which exclude microorganisms, the product is deemed an "aseptic fill". Other injectable products, in addition to the aseptic processing, undergo sterilization when in the final container, typically using steam under pressure. This procedure, if properly designed and executed, results in a terminally sterilized product.

One solution to the problems incurred through human contamination is through automation of the processing procedure. A paper entitled, "A Robotics System for the Sterility Testing of Injectables," Barbara J. Zlotnick and Michael L. Franklin, Pharmaceutical Technology, May 1987, describes a robotics system for sterility testing of vials. According to this paper a robot is used to perform sterility testing and minimize the manipulations performed by the analyst, thereby reducing the potential for technical contamination attributable to personnel. Since human intervention is minimized during testing, the environment of the test remains cleaner with respect to viable particulate matter. There is a lower level of human activity and less potential for contamination from shedding or from disruption of the laminarity of the air flow under the hood. A cleaner environment can then be used for a greater proportion of the work day.

In general, robotics dispensing devices known in the art include a dispensing apparatus comprising a base, and a robot device on the base. A number of stations are located on the base which cooperate with the robot device in a sequence of operations such as to produce a measured pharmaceutical dose from, a supply of pharmaceutically acceptable substances. Robotics dispensing apparatus systems are used for the rapid and efficient processing of a wide variety of pharmaceutical products, as well as perform various mechanical functions. Further, use of the robot device provides an efficient manner in which to maintain a sterile environment to produce the pharmaceutical products.

The transporting of articles via pneumatic tubes is old and well known. Basically, an object is placed within a container which is then transported by air under either positive or negative pressure from one destination to another. The transport is moved within a closed tube. The interior of the closed tube and the outer dimension of the carrier form a seal, so that the carrier can be propelled between the destinations by a vacuum.

In general, pneumatic tube systems known in the art include a closed continuous passageway having a predetermined inner cross-sectional dimension where the passageway includes a plurality of curves or bends having a predetermined radius. A fluid, such as air, is controllably forced through the passageway in a loop to move a carrier through the passageway. In order for the carrier to move freely through the passageway, the dimensions, and in particular the length, of the carriers being used have been limited by the inner cross-sectional dimension and curvature radius of the passageway. Pneumatic delivery systems are used extensively for the rapid and efficient transportation of a wide variety of articles. These delivery systems are used in a number of business operations, including banks, hospitals, office buildings, industrial plants, and truck terminals as a few examples.

One area of commerce which currently uses the pneumatic tube and the transporting of material via the pneumatic tube on a fairly regular basis is the hospital or biomedical research/manufacturing industry. One particular application of this technology is in the area of transporting blood samples, medicines, intravenous bags, viral samples or other biological or chemical matter between locations within a hospital or laboratory.

In that environment, for example, test tubes or vials of liquids are placed within a tube carrier, and are typically secured by foam or clamps within the carrier. The purpose of securing the samples (which are often contained within glass test tubes with rubber stoppers) is to help prevent breakage. When glass breaks or stoppers become dislodged (as can happen when hospital workers fail to properly secure the stoppers in the first place), chemical or biological substances can leak into the interior of the carrier. In turn, said substances can leak out of the interior of the carrier, thereby contaminating the interior walls of the tube system.

The vials or vessels of liquids, solids or gasses within the carrier can move or shift during transport, which can also lead to breakage. This problem is especially acute, as the carriers, are often traveling at speeds in excess of 25 feet per second. Because of the rapid acceleration and deceleration of pneumatic tube carriers, the carrier contents can easily become dislodged, and can break within the carrier, if not for clamps, foam securing means, and the like. Nonetheless, accidents can happen, whereby despite the best efforts toward securing or protecting the interior vessels, they can break, or their stoppers can become dislodged. In fact, dislodged stoppers are a primary problem, due mainly to workers who may inadvertently fail to secure them properly in the first place.

If the leaking substance is of a sufficient quantity, the substance (often a fluid) can leak out of the carrier. In that case; the entire tube transport system could become contaminated with the substance. For example, if fluids containing a virus or bacteria sample (for example, the HIV virus or the Ebola bacteria) were to leak out of a carrier, the interior of the vacuum transport tubes could become breeding grounds for the biological specimens—thus contaminating the exteriors of all carriers that pass through the system. Also equally important is that fluids escaping from the carrier can "gum up" the interior of the vacuum tubes, making the smooth passage of the carrier difficult, resulting in enhanced downtime, increased maintenance expense, and increased power consumption (that is, friction would increase within the tube system).

Of course, other problems can result. For example, a hospital worker may cut his or her hands on a broken vial or syringe when they proceed to open the carrier, and dangerous substances contained within the carrier may come in contact with the hospital worker. Also, in the case where toxic, aromatic substances such as toluene or benzene are being transported within vessels contained within the carriers, obviously, the worker would be placed in great danger if he or she opened the carrier under those circumstances. Basically, if a hospital worker opens a carrier expecting to remove sealed vessels and/or containers, and conversely, is presented with spilled contents (which may often be accompanied by broken glass, for example), then, the possibility of infecting the hospital worker or the overall tube system is great. For that reason, a watertight or airtight carrier could facilitate containing the hazardous substances within the carrier, so that vessels that may break or become unsealed in the transport process are contained within the carrier. Of course, problems can still result if workers open a carrier without knowledge of the hazardous circumstances within. To safeguard against that event, the carrier could contain an indicator on its exterior that notifies the carrier handler of the interior circumstances—before the carrier is opened. In that case, if the interior contents are, for example, toxic gasses, the carrier may be opened in a controlled, safe environment.

It is preferable in the present invention to use a carrier with suitable watertight and airtight properties, such that matter from within the carrier cannot escape to the outside, and matter that has become uncontrollable within the carrier can activate a warning indicator on the exterior of the carrier, so that hospital or other workers who use the carriers will not open carriers with uncontrolled contents (without ample warning that proper measures should be taken). That could be facilitated by a warning signal indicative of a spill or other abnormal condition within the carrier. Such a warning signal may even be a digital output, which can be decoded, to indicate what type of hazard lies within the carrier. Such a warning signal could also trigger a locking mechanism, making the opening of a carrier with spilled interior substances impossible, without authorization and a form of key, electronic or otherwise. Also, based on the contents of the carrier, the locking mechanism may be activated so that only certain parties may be able to open the carrier, regardless of whether an uncontrolled substance is contained within. For example, if a dangerous controlled substance such as morphine is being transported, the carrier may be locked, and only certain authorized persons would be able to open the carrier.

Pneumatic tube carriers for use with the present invention as well as in such pneumatic tube systems come in a wide range of sizes and shapes to accommodate the physical articles to be transported in the system. As an example, pneumatic carriers are provided for transporting cash, messages, stock transaction slips, letters, blueprints, electronic data processing cards, x-rays, pharmaceutical supplies, blood samples, narcotics, viral and bacteria cultures, and a variety of other small physical objects.

In the past, various mechanisms have been utilized as, closure devices for pneumatic tube carriers. For example, many such carriers include an end cap that is hinged with respect to a cylindrical hull on one side of the hull and which has a latch that fastens the end cap to the opposite side of the hull in a closed position. Such carriers employ a variety of fasteners, such as snap fasteners, elastic straps with holes that fit over hooks, or straps that may be secured to bendable posts.

Other types of pneumatic tube carriers are of the side opening variety. One conventional form of such a carrier employs two generally semi-cylindrical sections that are hinged along one longitudinal edge. The hinged sections may be swung toward or away from each other to effectuate opening and closing of the carrier hull. Locking is achieved by virtue of the end caps, which may be twisted to effectuate threaded engagement of the caps onto the carrier hull ends when the hinged hull sections have been closed. That is, the end caps are rotated in such a fashion as to be drawn towards each other onto the ends of the hull, thereby immobilizing the hull sections relative to each other. Rotation of the end caps in the opposite direction releases the hull sections and allows them to be opened.

One preferable configuration is that of a side opening, wherein the two sides are hinged together, and the two sides are held together when the carrier is closed by use of a hook, or detent or indented type locking lip. Such carriers include latching mechanisms to prevent the door from coming ajar or opening during transit, which could cause the carrier to become lodged in the pneumatic tubes and would also allow the contents of the carrier to spill out into the tube system. In addition, the instructions for latching such side opening containers or carriers are simple to follow, so that the container can be easily placed within the tube system. Such hinging and locking mechanisms make waterproofing or sealing the carrier a particularly difficult task, as the hinges and locks are embedded within the mold of the carrier, which is generally formed of plastic.

In another type of side opening pneumatic carrier, the access to the carrier is gained by simultaneously pulling and twisting the ends of the carrier to allow the side opening door to be opened. The instructions for such a two-step process are often difficult for many users to follow, and the physical effort and manual dexterity needed to simultaneously pull and twist both ends of the carrier against a spring resistance is often troublesome for many hospital workers.

The present invention displays a preference for a pneumatic carrier which can be easily opened, but which also maintains a watertight and airtight seal. Also, the carrier should be able to maintain its air and water tightness, despite, the fact that it is subjected to a vacuum transport system, and despite the fact that it will be subjected to extreme environmental conditions, such as repeated use, frequent drops, dust and dirt particles, high speed travel and acceleration, and the like. The carrier should also have a supplemental sensor mechanism to indicate that abnormal interior conditions have developed.

SUMMARY OF THE INVENTION

The present invention relates to an automated system for the storage and distribution of empty carriers for a pneumatic tube system. The system comprises an easy to use one-touch process and includes the following apparatus: storage piping and pneumatic tube system comprising a blower, controller, diverters, and a main zone diverter.

Pneumatic tube transportation systems are currently used to transfer Pharmaceuticals, blood samples, medicines, intravenous bags, viral samples or other biological or chemical matter between locations within a hospital, laboratory, etc., quickly and reliably. Manual delivery can be slow and unreliable, causing a number of problems, such as harm to patients in hospitals. Thus, it is an object of this invention to combine a conventional pneumatic tube system with an automated storage and distribution apparatus to provide a completely automated system for the efficient operation of a pneumatic tube system.

According to the invention there is provided an automated storage and distribution system comprising a pneumatic tube system, a connecting diverter with blower, and a storage cabinet with diverter. The system comprises several methods which are currently in the market place, and is useful in many places, such as hospitals where the automated processing of pharmaceutical products via robot devices is used. There, robot devices are employed having gripping means presentable to a plurality of stations, each station being adapted to cooperate with the robot device in a sequence of operations such as to provide a measured dose of a specific pharmaceutical substance. The substance might comprise a medication to be administered to a patient, or a potentially biologically damaging substance, such as a radionuclide or a cytotoxin. The measured dose might be retained in a said syringe, or in a medical vial. Preferably, means are provided for controlling the apparatus in a predetermined sequence of operations.

In the present invention, a computer interface provides bi-directional communication between the storage piping, pneumatic tube system, peripheral devices and a computer. The storage piping employed by the system are responsive to computer commands and capable of holding a plurality of carriers per pipe. Also attached to the storage piping may be a carrier auto-indexing unit which would catalog the carrier activity, keep record of the carriers in storage, i.e., how many are currently stored there along with their identification numbers, the users who request carriers, etc. The system described will receive its instructions from a computer interface established at the facility where the invention is in place. These instructions would be communicated to the storage piping located at the processing stations.

Although the embodiment of the present invention will be further described as used in hospitals to supply parenteral products, it is not limited to such a use. Other expressions of its use include dietary, laboratory and central supply systems. Additionally, motorized carts may be used for the transport of the empty pneumatic tube carriers from the storage cabinets to the receiving station or nurses' station or some other designated location.

BRIEF DESCRIPTION OF THE DRAWINGS

The invention will be better understood with reference to the drawings, in which:

FIG. 2 shows a perspective diagrammatic representation of an automatic specimen receiving station;

FIG. 3A shows a perspective diagrammatic representation of an automatic pharmacy distribution system for injectable products;

FIG. 6 shows an overall view of a carrier suitable for use with the present invention;

FIG. 6A shows a cross-section of both the end and side views of a preferable carrier for this invention;

FIG. 7A shows the interiors of both halves of a preferable carrier for use with the present invention;

FIG. 7B is a side view of a half of a carrier for use with the present invention, which shows a latch to lock the carrier in its closed position, and an indicator for signaling conditions interior to a carrier;

FIG. 7C is an end view of a carrier for use with the present invention, which shows an end bumper, and an end opening which allows the photo eyes to detect the contents of the carrier;

DETAILED DESCRIPTION OF THE PREFERRED EMBODIMENT

The purpose of the present invention is to provide a secure storage and retrieval system for pneumatic tube carriers, in a plurality of different compartments wherein the carriers can be retrieved from any compartment.

Figure 1:
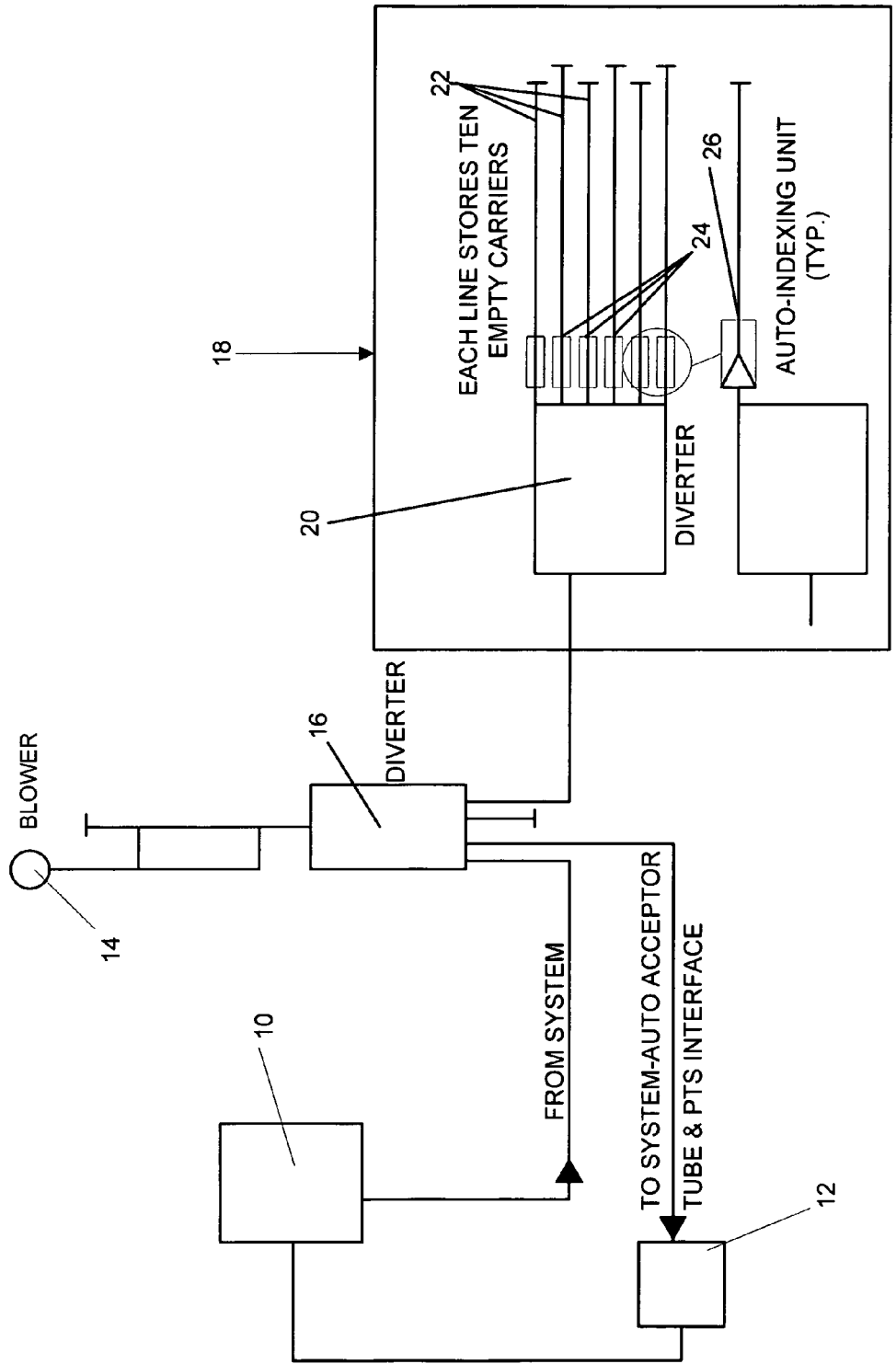
FIG. 1 shows functional block diagram of the present invention.
Figure 8:
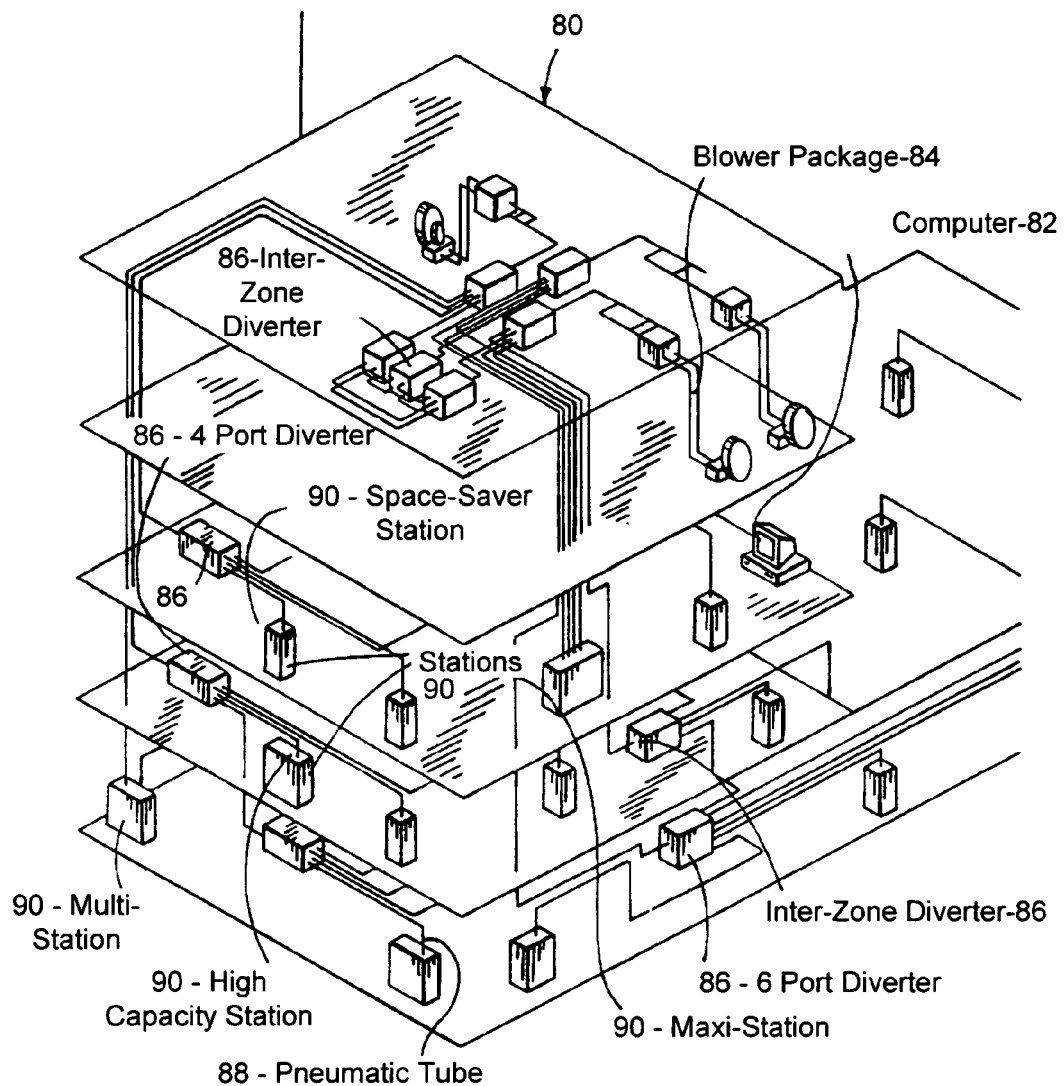
FIG. 8 is a perspective diagrammatic representation of a multi-zone pneumatic tube system.

Referring now to FIG. 1, an schematic overview of the present invention is shown, including a representation of how it may be positioned within an overall pneumatic tube system. FIG. 1 shows the present invention comprising, first, storage compartment 18 which comprises diverter 20, empty line 22, stored carriers 24, and auto-indexing unit 26. Connecting storage, compartment 18 to the pneumatic tube system 10, an example of such system is shown in FIG. 8, are blower 14 and diverter 16. Optionally, an AutoaceptorTube (as described in application Ser. No. 08/632,020) with pneumatic tube interface 12 can be used to include an automatic inspection station as well as an automatic product insertion/removal station.

The present invention includes blower 14 and diverter 16 which are necessary to coordinate and direct the transportation of carriers 24 from storage compartment 18 to pneumatic tube system 10, and vice versa. Within storage compartment 18 there are a plurality of storage lines 22, each of which can store at least ten carriers 24. Also, auto-indexing unit 26 allows the system to recognize and keep track of every carrier that is stored in storage compartment 18, including the time of storage, the name of the user who stored carrier 24, and any other information pertinent to the storage and retrieval of carrier 24.

By means of a touch key, only authorized employees can send to and retrieve from this storage cabinet. Even when the cabinet is installed in an unsecured location, the carriers cannot be retrieved by anyone, thus creating a secure storage unit. Several applications and locations for the present invention are available, such as large supermarkets, department stores or even where the storage of valuable goods or paperwork is crucial.

To better understand the present invention, it is helpful to look at through an example of a toll plaza. A tool plaza is a collection point on a highway where money has to be paid to cross a certain section of that road. A toll plaza comprises a main building and several toll booths, for example ten. Similarly, the present invention comprises a "main building" and several "toll booths".

Here, most of the equipment, the blower, the controller, the retrieval cabinet and the main/rejection station is located in the "main building". The "toll booths" each have a send/receive tube, a box with a PSMA/PLCD-T card and a touch key reader. These all operate together to provide enhanced security for the storage and retrieval of the carriers.

The system of the present invention works by the user initializing a touch key. Before the start of a shift, the user gets a touch key with a destination number and an entrance level. An entrance level is described as an access level providing for security within the system. For example, there may be three entrance levels, such as "User Level", "Operator Level" and "Supervisor Level". Each level would grant certain access rights or capabilities. For example, someone with access under any level may send a carrier from the stations, while the "User Level" and "Operator Level" may be restricted to only opening the retrieval compartment when the destination number on the touch key is the same as the user number on the compartment. "Supervisor Level", however, would not be restricted, and could access any compartment. Similarly, with respect to the controller of the storage cabinets, the "User Level" would be restricted the most, only allowing viewing of the "overall look" of the system, while the "Operator Level" could, in addition, do the manual and the full purge, as well as look at the unit information. Of course, the "Supervisor Level" would then have full access rights to all the menus of the controller.

For further security, a specific user number could be designated and programmed in an operator touch key to prevent a user from opening any compartment, something such as "000". Additionally, the various levels assigned to each touch key, as well as the names of each of the designated users, can be programmed by the touch key program through any personal computer.

After the touch key initialization, the user can then make a shipment. First, the user loads the carriers with f.e. coins, and sends the carrier to either the main station or to an individual compartment. If it is to the main station, then, on the touch keypad, the user dials the destination code of the main station, and loads the carrier in the send/retrieve tube. The system then asks for the user to touch the touch key to read the name of the user. After this, the carrier will be sent automatically and the transmission list of this shipment will be recorded with the name of the user on the touch key.

If, on the other hand, shipment is to the individual compartment, the process is slightly varied. First, after each shipment, the destination code will be updated to "000". When this code appears on the screen and the user is loading the carrier in the send/retrieve tube, the system will ask for the users touch key to read the destination of the user's compartment, as well as the name of the user. Then, the carrier will be sent automatically and the transmission list of this shipment will be recorded with the name of the user on the touch key.

With the above described procedure, it is irrelevant which "toll booth" station the user made the shipment from, the carrier will always go to his own compartment. In the embodiment of the present invention, a maximum of ten carriers can be stored per compartment. When more than ten carriers are sent to an individual compartment, the station will indicate that the compartment is full and that the carrier must be sent to the main station. In another embodiment, the system may automatically send the carrier to the main station when it determines the compartment to be full, while notifying the user of said action.

The next step involved is the retrieval process. After the user's shift, the user goes to the retrieval compartment and touches the reader on the compartment with his touch key. When the destinations code in the touch key is equal with the usernumber of the compartment, the door will be opened and the carriers will roll out. When all of the carriers are out, the user touches the reader with his touch key again, and the compartment door closes. All of the actions of the cabinet are recorded with the date/name and the name on the touch key. When the compartment is opened and closed, the controller will reset the counter of that compartment to "0" and new carriers can be sent to the compartment.

The supervisor can open any compartment and is allowed to open the cabinet itself. On a side of the cabinet is provided an extra touch key reader which activates, after reading a supervisor key, two solenoids which keep the door of the cabinet closed. Of course, every interference of a supervisor will be recorded in the transmission list.

Additionally, a printer or personal computer can be connected on the controller to store and view the transmission list and maintenance information. This can provide recordings of the time and location of the origination and destination of all shipments made. Also, a modem can be connected to the controller for immediate service response.

Figure 3B:
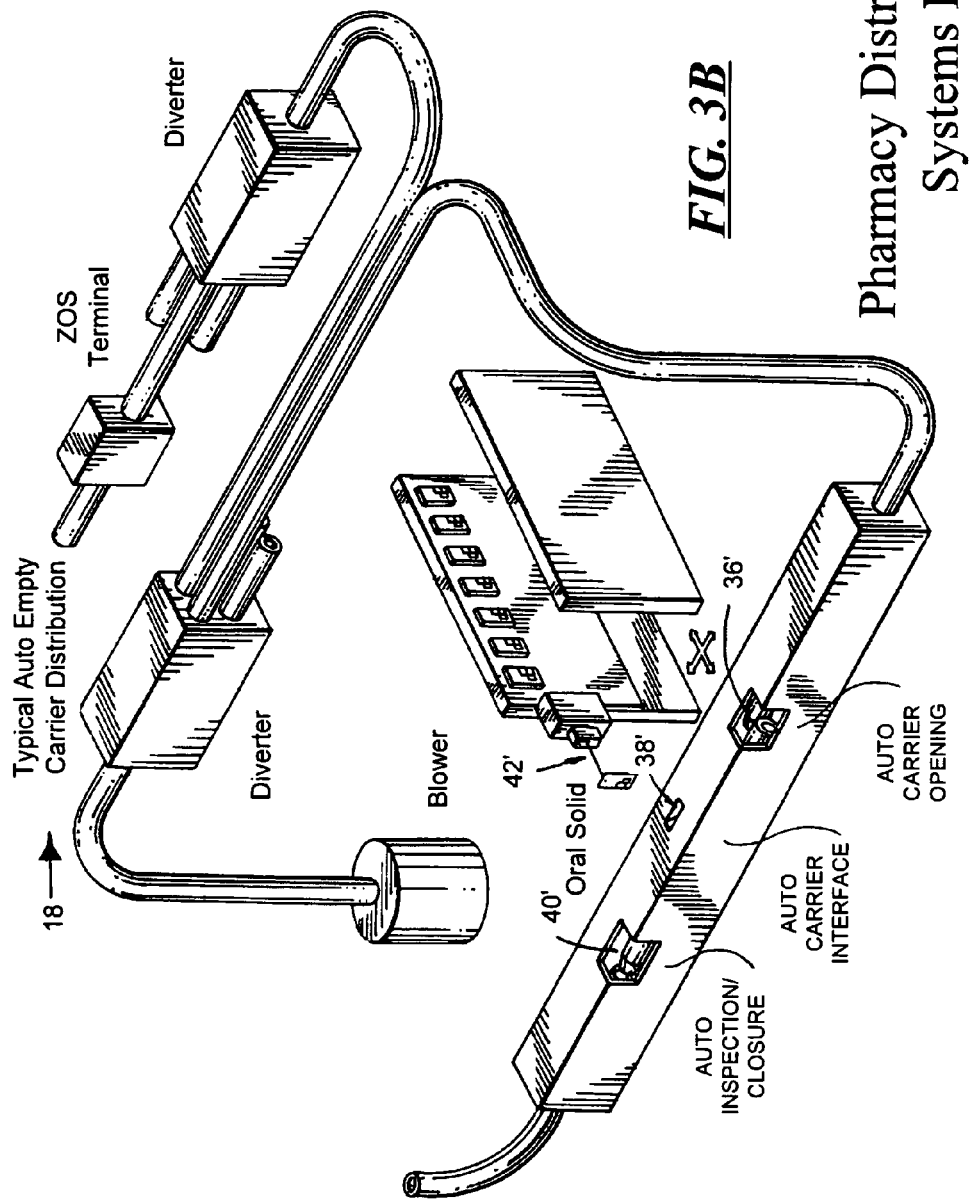
FIG. 3B shows a perspective diagrammatic representation of an automatic pharmacy distribution system for oral/solid products.

Referring now to FIG. 2, shown is an automatic receiving station 28 for use in conjunction with the present invention. FIG. 2 shows an automatic receiving station 28 for receiving products sent through a pneumatic tube system in a carrier. Like FIGS. 3A and 3B, FIG. 2 shows an automated system comprising three stages, here, a carrier opening stage 30, a product removal stage 32, and a carrier closing stage 34. The empty carrier first enters the opening stage 30, after coming from the pneumatic tube system, and is opened. The carrier is then moved to the removal stage 32 where the appropriate product is automatically removed from the carrier. Once the product is removed from the carrier, the carrier is moved to the third stage where the carrier can be, inspected and closed securely. The carrier would then be sent back to the empty carrier storage cabinet 18 of the present invention.

FIG. 3A shows an automatic loading and inspection station for injectable products to be loaded into carrier and sent to their destinations through the pneumatic tube system. FIG. 3A shows an automated system comprising a carrier opening stage 36, a carrier loading stage 38, and an inspection/closure stage 40. The empty carrier first enters the opening stage 36, after coming from the empty carrier storage and distribution system, where it is opened. The carrier is then moved to the loading stage 38 where the appropriate injectable product is automatically placed into the carrier. The injectable product is brought to the carrier via an incoming conveyor 42 from the product production station. The product enters the carrier through an opening in the top of the system. Once the product is loaded into the carrier, the carrier is moved to the third stage where the product and carrier are inspected. If approved, the carrier is closed securely and sent into the pneumatic tube system where it is delivered to the proper location.

Similarly, FIG. 3B shows an automatic loading and inspection station for oral/solid products to be loaded into carrier and sent to their destinations through the pneumatic tube system. Like FIG. 3A, FIG. 3B shows an automated system comprising a carrier opening stage 36', a carrier loading stage 38', and an inspection/closure stage 40'. The empty carrier first enters the opening stage 36', after coming from the empty carrier storage and distribution system 18, and is opened. The carrier is then moved to the loading stage 38' where the appropriate oral/solid product is automatically placed into the carrier. The oral/solid product is brought to the carrier via a robot system 42' which selects the appropriate oral/solid product from a product storage station. The robot system 42' then inserts the oral/solid product into the carrier through an opening in the top of the system. Once the product is loaded into the carrier, the carrier is moved to the third stage where the product and carrier are inspected. If approved, the carrier is closed securely and sent into the pneumatic tube system where it is delivered to the proper location.

Figure 4:
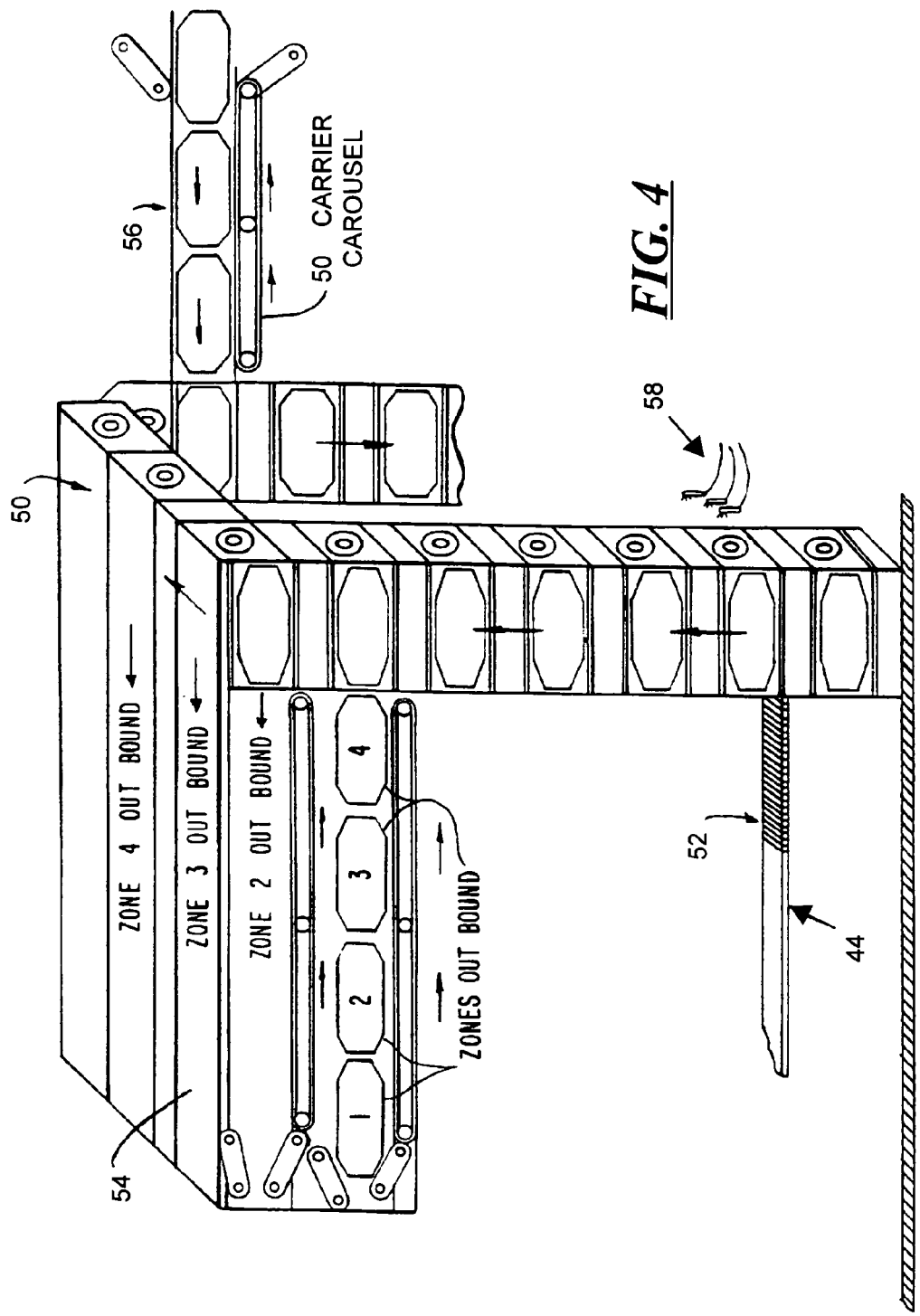
FIG. 4 shows a block diagram of the pneumatic tube carrier loading station using a turret style loader.

FIG. 4 represents a fifty carrier carousel loading station for the pneumatic tube system. It shows a fifty carrier carousel 50, conveyor 44, loading dock 52, four outbound tubes 54, four inbound tubes 56, and photo eyes 58. The transport bin containing the prepared product is transported to loading dock 52 via conveyor 44 from the inspection station. There a carrier 10 is presented to loading dock 52 as the fifty carrier carousel rotates past loading dock 52. A carrier 10 is presented to loading dock 52 in a closed position where photo eyes 58 verify that the carrier is the appropriate style carrier, that the carrier has an insert, and that the carrier insert is empty. If verified, the carrier 10 is removed from the carousel and the product is inserted into carrier 10. Carrier 10 is then inserted into an open member of carousel 50, which then rotates to the appropriate position to send carrier 10 containing the product to its proper destination via the pneumatic tube system.

However, if rejected, carousel 50 rotates so the photo eyes can check the next carrier, while keeping record of the rejected carrier and the reason for the rejection. This process continues until a useful carrier 10 is found. The system could notify the control system of the reject status of any carrier through a numbering or other labeling system distinguishing each carrier 10, and any rejected carrier 10 could be sent to a predetermined location to correct the defective condition.

Figure 5:
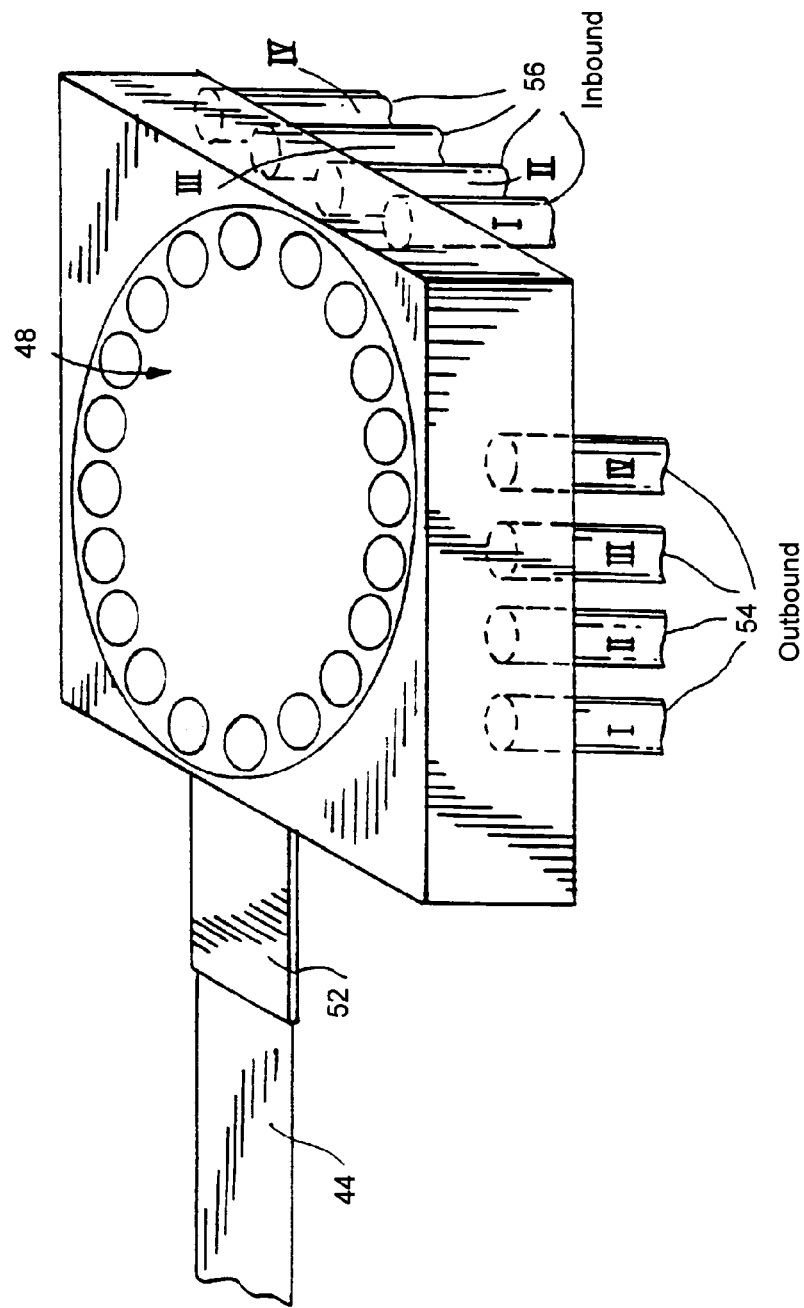
FIG. 5 shows a pneumatic tube loading carousel with a capacity of 50 carriers, a 4 zone inbound and outbound line system.

FIG. 5 represents an alternative loading station for the system. It shows a loading-device with a rotating turret 48. The transport bin containing the prepared product is transported to loading dock 52 via conveyor 44 from the inspection station. There a carrier 10 is selected from the rotating turret 48 after being verified as described above. Once verified, the carrier 10 is removed from turret 48 and the product is inserted into carrier 10. Carrier 10 is then inserted back into an open member of turret 48, which then rotates to the appropriate position to send carrier 10 and product to its proper destination via the pneumatic tube system.

Turret 48 can have a single rotatable turret with access to all zone of the pneumatic tube system, or it can have multiple rotatable turrets each corresponding to a single zone within the pneumatic tube system. Also, each turret can have the capacity to hold many carriers at a time.

In each of the above described loading systems (as shown in FIGS. 4 & 5), a robot arm could be used as the means for removing the carrier from the turret, inserting the product into the carrier, and returning the carrier to the appropriate turret opening. Further, in the case of syringe products, a plunger style loading system could be used wherein the robot arm or other device can insert the syringe into the appropriate carrier through an opening in its end without having to remove it from either the turret or the carousel.

Once the product and carrier are loaded, the carousel rotates to the appropriate outbound pneumatic tube. Four of such tubes could be used in this invention, one for each zone in the system. The carrier is then inserted into the tube and then sent to its predetermined destination. A series of diverters present in the system allow inter-zone communication, thus allowing the pneumatic tube system to be used for station to station delivery.

FIG. 6 is an overall view of carrier 60 preferred for use with the present invention. It shows carrier 60 consisting of first and second shells 62, 62' which extend longitudinally and which are interconnected by hinges 64 and rod locking members 68. Members 68 lock the rod in place, so that hinges 64 can provide for the opening and closing of the carrier 60 halves 62 and 62'. The carrier 60 halves 62 and 62' are formed of plastic, for example, and raised areas are formed along the exterior surface, around the transverse perimeter of the carrier, as shown as glide, or travel or accelerator rings 66. Two accelerator or glide or travel rings 66 are use for each carrier 60, and may consist of Velcro® secured plastic or rubber strips. A suitable felt material or Neoprene® material may also be used to make the seals 66, which may also be cut from a sheet of the material such that moisture will tend to cause dimension changes substantially in the direction longitudinal with respect to the carrier, rather than radially. The seals 66 may be adhesively attached to the shells 62 and 62' at respective raised portions. The purpose of the rings 66 is so that carrier 60 forms a tight, consistent and secure fit within the interior of the carrier tubes, so that the carrier 60 may travel effectively through the carrier tubes. As the carriers 60 often reach speeds in excess of 25 feet per second, the rings 66 serve to form an air barrier around the carrier 60, so that the carrier 60 does not jam. Also, by minimizing air leakage around the carrier, rings 66 can minimize the air required to propel carrier 60. Felt insert is provided, as well, so that the rings 66 appear as continuous concentric circles—and no air can escape the seal the rings 66 form in relation to the interior of the carrier tubes, even where the hinge assemblies 64 are concerned. Ends of the carrier are defined by respective resilient bumpers 72. Each of the bumpers 72 is preferably larger than half the diameter of the pneumatic tube to avoid possible jamming of one carrier 60 with a second carrier within the pneumatic tube. The shells 62 and 62' are substantially identical in shape and are preferably molded in the same or a similar mold form from a suitable plastic material such as LEXAN® (a trade mark for a polycarbonate plastic sold by GE Plastics). Because the shells 62 and 62' are substantially identical and can often be made from even the same mold, molding costs can be significantly reduced.

In order to simplify this description, parts of shell 62 will be described, but it should be understood that corresponding part's of shell 62' also may exist, as desired. The shell 62 is generally semi-cylindrical over the major portion of its length, with the exception, for example, of the raised portions under rings 66. Those raised portions may also correspond to internally concave zones, which may contribute to the overall structural integrity of the carrier 60.

The portions of carrier 60 that support the seals 66 are positioned intermediate the ends of the carrier 60 at positions which maximize the available length and diameter dimensions of the carrier. The shells 62 and 62' further includes tapered or frusto-conical end portions 70.

Hinge assemblies 64 are preferably molded as a part of the shells 62 and 62' and the pivot points of the hinges 64 are offset from mating edges of the shells 62 and 62' to permit the ends of the rings 66 and shells 62 and 62' to securely mate together when closed, without damage to the seal halves 66. The hinges 64 are preferably located so that they will not contact the interior of the carrier tube walls. Although the carrier tube walls are often made of steel, and the carriers 60 are often made of plastic, it is generally desirable to have only smooth, continuous surfaces contacting the interior of the carrier tube walls. For example, if a metallic hinge 64 were to scratch the interior of the carrier tube wall, ruts could result, which will facilitate air seepage, and a loss of system efficiency, as air passes through said ruts.

FIG. 7A shows the interiors of both halves (62 and 62') of a preferred carrier 60 for use with the present invention. FIG. 7B is a side view of a half of a carrier 60 according to the present invention, which shows a latch 66' to lock the carrier 60 into its closed position, and an indicator for signaling conditions interior to a carrier 60. FIG. 7C is an end view of a carrier 60 according to the present invention, which shows the bumper, and openings 76 and 78 for use with the photo eyes.

Shells 62 and 62' form an internal cavity when closed together. That internal cavity is the usually the entire reason why the carrier 60 exists in the first place. However, certain exceptions may exist. For example, carrier 60 may be not a cavity bearing carrier at all, but rather a sophisticated monitoring vehicle, which contains video or other sensors, to inspect the interior workings of a pneumatic system. In that case, carrier 60 would be sent through a tube system, and could transmit or record information indicative of the interior walls of the pneumatic tube system. More usually, the carrier 60 with its internal cavity in place will be used to carry articles between remote points.

Carrier 60 is capable of carrying papers, such as drawings, business documents cash, X-ray negatives and the like. Carrier 60 is often used to carry vessels, wherein the vessels often contain liquid, solid or gaseous materials that should ideally remain within the vessels. That is, the carrier 60, which moves at high speeds, is often used to carry vessels that contain various liquid substances, which are prone toward leaking out of the carrier 60, if the vessels should break within the carrier 60, or should the vessels become opened in transit (because, for example, a rubber stopper was not securely seated in the first place, or otherwise failed). Specifically, when the carrier 60 is used within the hospital environment, problems can result when vessels break or open within the carrier 60. The vessels in hospitals often include test tube with rubber stoppers, intravenous ("IV") bags, blood samples, viral or bacteria cultures, chemicals or other drugs, medicines, acids, or other materials that must be controlled or contained at all times. Indeed, the vessels may even contain biohazardous materials, such as HIV infected blood, cultures of various viral infections, toxic chemicals such as cyanide, and the like.

Naturally, whenever fragile objects (such as glass test tubes) are to be placed in the carrier 60, these objects are typically mounted in a container or retaining unit, which has been formed to fit snugly within the cavity defined by the interior surfaces of shells 62 and 62', thereby limiting the possibility of damage to the contents as the carrier passes through the pneumatic tube system. To safeguard against the leakage of such materials, and others, the carrier 60 according to the present invention has been designed with an internal perimeter wall 74. Perimeter wall provides an additional layer of protection against exposure to the outside world.

Perimeter wall 74 outlines the entire perimeter of carrier 60—more specifically, the boundaries of shells 62 and 62', as set forth in FIG. 7A. Also as shown in FIG. 7A, projections and receptors 72 (on both shells 62 and 62') are adapted to engage each other, as opposed on the opposing shells 62 and 62'), to retain the shells 62 and 62' in a closed position as shown in FIG. 6, with the use of detent latches or locks (not shown). The projections 72 have respective inclined leading faces for deflecting the projections radially inwards as the shells 62 and 62' are brought together. As the shells 62 and 62' move into a closed position, the projections and receptors 72 move radially outward into respective openings, to retain the shells 62 and 62' in the closed position. One major advantage of this arrangement is that the closing of the shells 62 and 62' is a natural actions and requires no teaching. Anyone wishing to close the carrier 60 will naturally bring the shells 62 and 62' together resulting in a snap-action as the detent or interlocking latches move into their mating openings. Respective longitudinal edges of the shells 62 and 62' define interlocking recesses and projections indicated generally by the numerals 72. These edges locate the shells 62 and 62' relative to one another when the shells are in the closed position. Also, because of their shape, the projections/receptors 72 align corresponding edges of the shells on closing the carrier and also prevent closing the carrier unless the contents are entirely inside the shells. Further advantages of these projections 72 include increased torsional stability because of the interlocking arrangement; and an incidental advantage that because a carrier which is not completely closed will not fit into a pneumatic tube, an operator is forced to ensure that none of the contents project out of the carrier.

In use, it will be evident that unless the shells 62 and 62' are closed, the carrier 60 cannot be entered into a pneumatic tube. This is a significant advantage of the carrier because in the past, if carriers are entered into a tube without first closing the carrier, the result may be to lose the contents of the carrier 60 within the pneumatic tube system or in fouling the system to the extent that it no longer functions satisfactorily. Once the shells 62 and 62' are brought together so that the projections 72 engage in respective openings, the carrier 60 can be locked by inserting a key in, for example, a tumbler lock 66' (shown in FIG. 7B) and turning a key, or setting a combination. The carrier 60 can then be opened only by further use of the key. However, reference is again made to FIG. 7B to describe the lock switch 66'. Alternatively, only authorized persons having a key for an actual lock 66' could be established, to open the carrier, for example, if a controlled substance such as morphine is contained within the carrier 60.

As shown in FIG. 7B, latch switch (or lock) 66' is used to depress the detent locking mechanism, so that the shells 62 and 62' can be separated, and the carrier 60 opened. Locking latches 66' are provided for retaining shells 62 and 62' in the closed position. In addition, electronically activated locks with pins (not shown) may be disposed between shells 62 and 62', so that latch switch 66' may be overridden, or defeated, so that the user of a carrier 60 will not open it if a vessel has become opened or broken in travel. To facilitate this function, an indicator is provided on the exterior of the carrier 60. The indicator is connected to internal sensor unit. The indicator will serve to inform the user that a spill or leak has occurred within the cavity of carrier 60. When the sensor unit detects the presence of a leak or spill (blood, gas, chemicals, liquids, etc.), the indicator, which may be a digital display, LED, or even an RS 232 communications port, will inform the user or an external computer, that something has become uncontrolled within the carrier 60. Then, proper precautions may be taken when opening the carrier 60. For example, if toluene has become released within carrier 60, the sensor will identify it as such (via, for example, gas chromatography), and will output its result to the indicator. Then, the indicator, which may be an LED, series of LEDs (which may indicate, for example, the severity of the interior condition), or an RS 232 port, can then output the result to a computer (not shown). In automated carrier tube systems, the carrier could even inform the receiving station (the opening to the vacuum tubes) of the condition, so that a user will be presented by, for example, a warning light, so that they will not open the carrier 60 until, in the case of toluene, the carrier 60 is brought to a ventilation hood, so that hazardous fumes may be vented safely away.

It will be appreciated that although the above parenteral products automation system description is limited to use in a hospital, the invention is not limited to such use. For instance, if found suitable, the invention could be used in other businesses or enterprises. While the foregoing embodiments of the invention have been set forth in considerable detail for the purposes of making a complete disclosure of the invention, it will be apparent to those of skill in the art that numerous changes may be made in such details without departing from the spirit and the principles of the invention.

FIG. 8 is an overall view of a pneumatic tube system 80. It shows a three-zone system comprising one blower, package 84 per zone, pneumatic tubes 88, inter-zone diverters 86, computer 82, and receiving stations 90, all connected via single transmission tubing. Carriers move through the system shown in FIG. 8 under vacuum or pressure as supplied by blower package 84. As the carriers move through the system, the diverters 86 change position to change the direction of the carrier. Also, diverters 86 make inter-zone communications possible.

Although FIG. 8 demonstrates a three zone system with a limited number of receiving stations 90, a system with numerous zones and virtually unlimited stations 90 is possible.

It will be appreciated that although the above description is limited to a system for use in a hospital pharmacy, the invention is applicable for other similar purposes. For instance, the invention may be used with dietaries, laboratories, central supply areas, etc. While the foregoing embodiments of the invention have been set forth in considerable detail for the purposes of making a complete disclosure of the invention, it will be apparent to those skilled in the art that numerous changes may be made in such details without departing from the spirit and the principles of the invention.

Although the invention herein has been described with reference to particular embodiments, it is to be understood that these embodiments are merely illustrative of the principles and applications of the present invention. It is therefore to be understood that numerous modifications may be made to the embodiments described herein and that other arrangements and techniques may be devised without departing from the intended scope of the present invention as defined by the appended claims.

I claim:

1. A separate empty carrier apparatus for the automatic storage, retrieval and distribution of empty pneumatic tube carriers on demand to and from a plurality of destinations within a pneumatic tube system, said apparatus comprising:
    at least one computer having a database for receiving and transmitting information within said pneumatic tube system;
    at least one empty pneumatic tube carrier of a plurality of pneumatic tube carriers, wherein said at least one empty pneumatic tube carrier being generally cylindrical and disposed about a longitudinal axis;
    a first diverter coupled to said pneumatic tube system for directing said at least one empty pneumatic tube carrier to said pneumatic tube system;
    a storage compartment for storing said at least one empty pneumatic tube carrier, wherein said storage compartment comprises a second diverter for moving said at least one empty pneumatic tube carrier to said first diverter for distribution to said pneumatic tube system, wherein said at least one empty pneumatic tube carrier is associated with a predetermined location in said storage compartment; and
    at least one control means for facilitating sending said at least one empty pneumatic tube carrier between at least one user station of a plurality of user stations or facilitating sending said at least one empty pneumatic tube carrier between said at least one user station and said storage compartment;
    wherein said storage compartment is connected to said pneumatic tube system via said first diverter,
    wherein said at least one empty pneumatic tube carrier is received from said at least one user station and stored in said predetermined location in said storage compartment,
    wherein said at least one empty pneumatic tube carrier is returned to said at least one user station if said predetermined location is full,
    wherein a notification message is displayed at said at least one user station sending said at least one empty pneumatic tube carrier if said at least one empty pneumatic tube carrier is returned to said at least one user station,
    wherein said at least one empty pneumatic tube carrier is directed to said storage compartment or directed to said at least one user station within said pneumatic tube system in response to said information.

2. An apparatus according to claim 1, wherein said storage compartment is connected to an auto-indexing unit.

3. An apparatus according to claim 2, wherein said auto-indexing unit identifies said plurality of pneumatic tube carriers.

4. An apparatus according to claim 2, wherein said auto-indexing unit identifies any contents of said plurality of pneumatic tube carriers.

5. An apparatus according to claim 1, further comprising a plurality of storage compartments.

6. An apparatus according to claim 5, wherein each of said plurality of storage compartments can store a plurality of said pneumatic tube carriers.

7. An empty carrier controlled system for the automatic storage, retrieval and distribution of empty pneumatic tube carriers on demand, said system comprising:
    at least one computer;
    a storage unit;
    a pneumatic tube system including pneumatic tubing, a plurality of dispatch and receiving stations, at least one diverter, and at least one blower; and at least one empty carrier;

wherein said computer receives and transmits information within said empty carrier system for automatically controlling the distribution of separate active carriers and separate ones of said empty carriers on demand;

wherein said at least one empty carrier is associated with a predetermined location in said storage unit wherein said at least one empty carrier is received from said receiving station and stored in said predetermined location in said storage unit, wherein said at least one empty carrier is returned to said receiving station if said predetermined location is full, wherein a notification message is displayed at said receiving station sending said at least one empty carrier if said at least one empty carrier is returned to said receiving station, wherein said diverter coordinates the storage and distribution of said empty carriers between said storage unit and said pneumatic tube system; and wherein said blower moves said empty carriers through said pneumatic tubing.

8. A system according to claim 7, wherein said storage unit further comprises:

an auto-indexing device.

9. A system according to claim 7, wherein said storage unit comprises a plurality of compartments.

10. A system according to claim 9, wherein each of said compartments can store a plurality of said carriers.

11. A method for automatically storing, retrieving and distributing empty pneumatic tube carriers in a storage and distribution system comprising a computer, a plurality of empty and active carriers, a pneumatic tube system including a plurality of active stations, pneumatic tubing, a diverter and a separate empty carrier storage device, said method comprising the steps of:

inputting information into said computer for controlling said storage, retrieval and distribution of said empty carriers;

storing said empty carriers in said empty carrier storage device;

transmitting said information from said computer to said separate empty carrier storage device and said pneumatic tube system; and transporting said empty carriers from said separate empty carrier storage device to said active station within said pneumatic tube system on demand, wherein said at least one empty carrier is associated with a predetermined location in said empty carrier storage device, wherein said at least one empty carrier is received from an active station of said plurality of active stations and stored in said predetermined location in said empty carrier storage device, wherein said at least one empty carrier is returned to said active station if said predetermined location is full, wherein a notification message is displayed at said active station sending said at least one empty carrier if said at least one empty carrier is returned to said active station, wherein said empty carrier storage device is connected to said pneumatic tube system by conventional pneumatic tubing for providing a path for the automatic storage, retrieval and distribution of said empty carriers; and wherein said empty carriers are distributed to one of said empty carrier storage device and said receiving stations within said pneumatic tube system in response to said information.

12. A method according to claim 11, wherein said separate empty carrier storage device comprises pneumatic tubing.

13. A method according to claim 11, wherein said method further comprises the step of:

identifying said carriers.

14. A method according to claim 13, wherein an auto-indexing unit performs said identifying.

15. A method according to claim 13, wherein said method further comprises the step of:

identifying any contents of said carriers.

16. A method according to claim 15, wherein said identifying is performed by an auto-indexing unit.

* * * * *